United States Patent Office 3,661,795
Patented May 9, 1972

3,661,795
PHOSPHATIDE EMULSIFIERS
Hermann Pardun, Cleves, Germany, assignor to Lever Brothers Company, New York, N.Y.
No Drawing. Filed Jan. 8, 1970, Ser. No. 1,558
Claims priority, application Germany, Jan. 9, 1969,
P 19 00 961.1
Int. Cl. B01f 17/30
U.S. Cl. 252—356      5 Claims

ABSTRACT OF THE DISCLOSURE

An emulsifying agent suitable for use in margarine and preparable as dry flakes or pellets comprises from 10 to 50 parts by weight of a partially hydrolysed vegetable phosphatide having a lysophosphatide content of from 2 to 15% by weight of the dry phosphatide, and from 90 to 50 parts by weight of a saturated fatty acid mono/diglyceride having a monoglyceride content of from 35 to 90% by weight.

This invention relates to emulsifying agents comprising modified vegetable phosphatides and to processes for their preparation.

Crude hydrated vegetable phosphatides (or plant lecithins) are obtained as by-products in the solvent-extraction of oilseeds for edible oil production. In a typical commercial process (as more fully described in British Pat. 1,118,373) they are precipitated as slimes by the introduction of moist steam into the solvent-free crude vegetable oil, and then separated from the bulk of the oil by centrifugation and dried by evaporation under reduced pressure. The dried crude phosphatides consist of a mixture of about 65% by weight of materials insoluble in acetone, namely choline, ethanolamine, serine and inositol phosphatides, sugars and glycolipids, and about 35% of acetone-soluble substances, namely neutral oil, free fatty acids and unsaponifiable constituents.

Such vegetable phosphatides are used as emulsifying agents for both oil-in-water and water-in-oil emulsions, but the choline phosphatide components on the one hand, and the ethanolamine and serine phosphatide components (together known as cephalin) on the other, antagonise or depress the emulsifying power of each other. By alcohol extraction, for instance as described in British Pat. 1,113,241, alcohol-soluble and alcohol-insoluble fractions of improved emulsifying power can be obtained; the alcohol-soluble fraction, which is enriched in choline phosphatide, is particularly suitable for oil-in-water emulsions, and the alcohol-insoluble fraction, which is enriched in cephalin, is particularly suitable for water-in-oil emulsions. As these fractions are viscous, waxy substances that are difficult to disperse, it has been proposed to add to them carrier substances such as vegetable oils, for instance refined coconut oil, groundnut oil, hardened sunflower oil, hydroxylated soyabean oil, a mixture of mono-, di- and tri-glycerides, cocoabutter, or lard, as well as organic solvents, for instance propylene glycol, diethylene glycol ethyl ether, terpenes, turpentine, or petroleum fractions boiling at above 150° C. for example kerosine and lubricating oil, in order to obtain more easily dispersible emulsifying agents. U.S. Pat. 2,640,780 describes the use of alcohol-soluble phosphatide fractions together with mixtures of fatty acid mono- and di-glycerides as emulsifiers and anti-spattering agents in margarine.

Danish Pat. 101,649 describes the improvement of the emulsifying power of crude vegetable phosphatides by treating aqueous oil-containing vegetable phosphatide emulsions with lipase at from 50° to 80° C. for several hours. The lipase effects a partial hydrolysis of the faty acid triglyceride of the oil to a mixture of mono- and di-glycerides, giving a product of improved emulsifying power, but an undesirable increase in free fatty acid content occurs, as a result of which the taste of the products thus prepared is less pleasant than that of normal vegetable phosphatides.

French Pat. 1,577,393 describes the preparation of partially hydrolysed vegetable phosphatides of improved emulsifying power for use in oil-in-water and water-in-oil emulsions by the partial hydrolysis at 50–100° C. of vegetable phosphatides emulsified with water at a pH of between 2 and 12.

It has now been found that a fat-soluble emulsifying agent that combines excellent emulsifying and stabilising action for oil-in-water emulsions, and especially for water-in-oil emulsions, and at the same time is convenient to apply, being stable particularly with respect to oxidation, and that is especially suitable for use in the production of margarine used in frying can be obtained by a combination of a partially hydrolyzed phosphatide and certain fatty acid mono- and di-glyceride mixtures.

According to this invention there is provided an emulsifying agent comprising from 10 to 50 parts by weight of a partially hydrolysed vegetable phosphatide that has a lysophosphatide (monoacyl glycerophosphatide) content of from 2 to 15% by weight of the dry phosphatide and from 50 to 90 parts by weight of a mixture of fatty acid mono- and di-glycerides (hereinafter termed a fatty acid mono/diglyceride) with an iodine value of not more than 10 and a monoglyceride content of from 35 to 90% by weight, the total amount of partially hydrolysed vegetable phosphatide and fatty acid mono/diglyceride being 100 parts.

Preferably the emulsifying agent comprises from 20 to 30 parts by weight of the partially hydrolysed vegetable phosphatide and from 70 to 80 parts by weight of the fatty acid mono/diglyceride, and preferably the iodine value of the fatty acid mono/diglyceride is not more than 3. Preferably the emulsifying agent is in solid particulate form.

The partially hydrolysed vegetable phosphatide used can be prepared by submitting an aqueous emulsion of an essentially unhydrolysed vegetable phosphatide, for instance a hydrated vegetable phosphatide, to the action of phospholipase A (lecithinase A) used either with other enzymes as pancreatin or as partially heat-inactivated pancreatin, or to chemical hydrolysis described in French Pat. 1,577,393 referred to above, by heating at a pH of from 2 to 12, preferably from 4 to 6, at from 50° to 100° C., until the required lysophosphatide content is reached. Suitable phosphatides for use in such a process are soyabean, rapeseed and corn oil phosphatides. Preferably the partially hydrolysed vegetable phosphatide contains from 2 to 10% lysophosphatide.

Suitable fatty acid mono/diglycerides are for example those that have been prepared by interesterifying with glycerol sunflower, groundnut, soyabean, palm, safflower, linseed, maize or rapeseed oil that has been hardened to an iodine value of not more than 10. Triglyceride oils whose fatty acids have from 16 to 22 carbon atoms are generally suitable, and particularly good results are obtained with fatty acid mono/diglycerides derived from fully hardened soyabean, palm or rapeseed oils.

The emulsifying agents of the invention can be prepared by mixing the partially hydrolysed plant phosphatide with the fatty acid mono/diglyceride at a temperature above the melting point of the combined product, for instance from 60° to 100° C., and preferably about 80° C., and converting the mixture to solid particulate form, for instance by cooling the hot liquid mixture on a rotating drum and thus forming flakes, or by spray-cooling to form pellets.

An emulsifying agent according to the invention has the advantage that it can be prepared in the form of light-coloured dry flakes or pellets that during storage even at room temperature do not exude oil and do not cake together, so that it can be loaded into paper bags. The flakes flow easily and are therefore readily measured out. Because of its good stability to oxidation an emulsifying agent of the invention retains a neutral taste after several months' storage.

The invention is illustrated by the following examples, in which all temperatures are in ° C., and quantities are on a weight basis.

EXAMPLES 1 TO 5

A liquid partially hydrolysed vegetable phosphatide was obtained by the action on a crude hydrated soyabean phosphatide in the presence of an equal quantity of water at 60° during 15 hours of 0.05% of technical pancreatin based on the phosphatide, followed by removal of the water under reduced pressure at 40°. The product had an acid number of 33 and contained 2.04% phosphorus, 61% acetone-insolubles, 20.6% choline phosphatide, 8.0% cephalin and 3% lysophosphatide.

The product was mixed at 80° with a fatty acid mono/diglyceride containing 48% of monoglycerides and an iodine value of 3, which had been obtained by the inter-esterification of fully hardened palm oil with glycerol, and in varying proportions as indicated in the table below.

A portion of each of the emulsifying agents thus obtained was then poured into moulds measuring 135 x 110 x 30 mm., upon which the mass immediately crystallised. 5 days after removal from the moulds the oil exudation and hardness by cone penetrometer (40° cone, 160 g. equivalent weight) of each block was measured, with the following results.

| Example No. | Partially hydrolysed phosphatide, percent | Fatty acid mono/ diglyceride, percent | Oil exudation, mg./ cm.2/50 g. | Hardness penetration in mm. |
| --- | --- | --- | --- | --- |
| 1 | 10 | 90 | 0 | 1.32 |
| 2 | 20 | 80 | 0 | 1.32 |
| 3 | 30 | 70 | 0 | 1.32 |
| 4 | 40 | 60 | 0 | 1.32 |
| 5 | 60 | 50 | 0.1 | 1.32 |

Another portion of each emulsifying agent was led at 80° over a rotating cooling drum through which was passed water at 15°. In each instance were formed bright yellow flakes, which after several months storage at room temperature showed no tendency to adhere.

Finally a portion of each emulsifying agent was converted into fine droplets by spraying in a tower, up which was passed air at 10°. The droplets were thus cooled to pellets of about 2 mm. diameter, which retained their form for several months unchanged.

The emulsifying agents were then tested for their emulsifying and anti-spattering action in margarine. Margarine was prepared containing 80% fat, 4% milk, 0.2% starch, 0.2% salt and 0.4% of either the partialy hydrolysed phosphatide alone, or of the fatty acid mono/diglyceride from hardened palm oil alone, or of the emulsifying agent of Examples 1, 2 or 3. A margarine was also prepared without either partially hydrolysed phosphatide or fatty acid mono/diglyceride, and a further margarine with 0.12% of partially hydrolysed phosphatide only.

The margarine composition thus prepare were heated by the methods described in Fette, Seifen, Anstrichmittel, 1963, 65, 29, and the formation of spatter determined on the visually assessed basis:

7—good  
6—satisfactory  
5—adequate  
4—unsatisfactory  
3—bad  
2—very bed  
1—unusable

| Example No. | Partially hydrolysed phosphatide | Fatty acid mono/ diglyceride | Spatter formation |
| --- | --- | --- | --- |
|   | 0 | 0 | 1 |
|   | 0.12 | 0 | 3–4 |
|   | 0.4 | 0 | 7 |
|   | 0 | 0.4 | 2 |
| 1 | 0.04 | 0.36 | 5 |
| 2 | 0.08 | 0.32 | 6 |
| 3 | 0.12 | 0.28 |   |

The emulsifying agents of Examples 1 to 3 show a better anti-spattering action than was to be expected for the above proportional amounts from the anti-spattering action of the individual components.

EXAMPLES 6 TO 8

500 kg. of crude hydrated soyabean phosphatide was stirred with 500 kg. of water to form an emulsion, 0.5 kg. of technical pancreatin added, and the mixture hydrolysed for 8 hours at 50° and then freed of water by heating under reduced pressure at 80°. The yield of partially hydrolysed phosphatide was 500 kg., and the liquid product contained 2.14% phosphorus, 64% acetone-insolubles, 14.1% chlorine phosphatide, 8.4% cephalin and 2.8% lysophosphatide.

Emulsifying agents were prepared from the partially hydrolysed phosphatide and a fatty acid mono/diglyceride which had been obtained by the interesterification of fully hardened soyabean oil with glycerol and which contained 45% monoglycerides and had an iodine value of 5, by mixing them at 80°, using on the one hand 10, 20 and 30% of phosphatide and on the other 90, 80 and 70% of the fatty acid mono/diglyceride. The emulsifying agents were formed into flakes on a rotating cooling drum, and were each incorporated in a series of quantities of from 0.025 to 0.4%, as given in the table below, in margarine formulations containing 80% fat, 4% milk, 0.2% starch and 0.2% of salt. The margarines thus obtained were heated by the standard methods described in Fette, Seifen, Anstrichmittel, 1963, 65, 29, and spatter formation determined.

Comparisons were made with margarines prepared from an emulsifying agent consisting of an alcohol-soluble phosphatide fraction prepared according to United States Patent 2,640,780 and a fatty acid mono/diglyceride. In preparing such a phosphatide fraction by the process of the U.S. patent, 500 g. hydrated soya phosphatide was first freed of oil by triple extraction with 1500 ml. acetone, and the oil-free residue thus obtained was separated by triple extraction with alcohol (96% by volume) into an alcohol-soluble fraction and an alcohol-insoluble fraction. There resulted 111 g. of an alcohol-soluble phosphatide fraction. Emulsifying agents were then prepared which on the one hand contained 10, 20 and 30% of this fraction and on the other 90, 80 and 70% of the fatty acid mono/diglyceride described above.

These emulsifying agents were incorporated in a series of quantities of from 0.025 to 0.4% by weight in the same margarine formulation as that used with the emulsifying agents of the invention. The margarine thus obtained were likewise heated by the above-mentioned standardised methods and spatter formation determined.

The results are given in the following table, where the spatter assessment is on the same basis as in Examples 1 to 3, A represents partially hydrolysed phosphatide and B the alcohol-extracted phosphatide of the U.S. patent.

| Example No. | Emulsifying agent, proportion of phosphatide A or B to mono/diglyceride G, percent | Spatter formation at amount of agent | | | | | |
|---|---|---|---|---|---|---|---|
| | | 0% | 0.025% | 0.05% | 0.1% | 0.2% | 0.4% |
| 6 | 10 A:90 G | 1 | 1 | 1 | 3 | 5 | 7 |
|   | 10 B:90 G | 1 | 1 | 1 | 3 | 3 | 4 |
| 7 | 20 A:80 G | 1 | 1 | 2 | 3 | 5 | 6 |
|   | 20 B:80 G | 1 | 1 | 1 | 3 | 3 | 4 |
| 8 | 30 A:70 G | 1 | 1 | 2 | 4 | 5 | 7 |
|   | 30 B:70 G | 1 | 1 | 1 | 2 | 3 | 4 |

The superiority of the emulsifying agents of the present invention is clearly demonstrated.

EXAMPLE 9

500 kg. of a hydrated vegetable phosphatide slime obtained by the hydration of extracted rapeseed oil, which contained 52% water, 14.5% neutral oil and free fatty acids as well as 33.6% by weight of phosphatides, was treated with 500 kg. water and sufficient citric acid to give the mixtures a pH of 4. The mixture was heated with occasional stirring to 95° for 17 hours, then freed of most of the water by centrifugation and finally evaporated under reduced pressure at 70°. There resulted 240 kg. of a partially hydrolysed rapeseed phosphatide with an acid number of 47, containing 2.3% phosphorus, 69% acetone-insolubles, 13.5% choline phosphatide, 6.6% cephalin and 4.4% lysophosphatide.

30 parts by weight of this partially hydrolysed phosphatide was mixed at 85° with 70 parts of a fatty acid mono/diglyceride of M.P. 85°, iodine value 0.6, containing 38% monoglyceride, which had been obtained by interesterification of fully-hardened rapeseed oil with glycerol, and the mixture formed into flakes on a cooling drum.

The mixture thus formed was incorporated in a series of quantities of from 0.025 to 0.2% by weight in a margarine formulation containng 80% fat, 4% milk, 0.2% starch and 0.2% by weight of salt. The margarines thus obtained were heated by the above-mentioned standardised methods and spatter formation determined. For comparison margarine samples which contained the same quantities of partially hydrolysed rapeseed phosphatide (that is, 30% of the series of from 0.025 to 0.2%), but no fatty acid mono/diglycerides, were similarly investigated.

| Partially hydrolysed rapeseed phosphatide [1] | 0 | 0.0075 | | 0.015 | | 0.03 | | 0.06 | |
|---|---|---|---|---|---|---|---|---|---|
| Fatty acid mono/diglyceride [1] | 0 | 0 | 0.0175 | 0 | 0.035 | 0 | 0.07 | 0 | 0.14 |
| Spatter formation | 1 | 1 | 1 | 1 | 1 | 2 | 4 | 3 | 4 |

[1] Amount incorporated, percent.

What is claimed is:

1. An emulsifying agent consisting essentially of from 10 to 50 parts by weight of a partialy hydrolysed vegetable phosphatide that has a lysophosphatide content of from 2 to 15% by weight of the dry phosphatide and from 50 to 90 parts by weight of a fatty acid mono/diglyceride with an iodine value of not more than 10 and a monoglyceride content of from 35 to 90% by weight, the total amount of partially hydrolysed vegetable phosphatide and fatty acid mono/diglyceride being 100 parts.

2. An emulsifying agent according to claim 1, consisting essentially of from 20 to 30 parts of the partially hydrolysed vebetable phosphatide and from 70 to 80 parts of the fatty acid mono/diglyceride.

3. An emulsifying agent according to claim 1, in which the fatty acid mono/diglyceride is one derived from fully hardened soyabean, palm or rapeseed oil by interesterification with glycerol.

4. An emulsifying agent according to claim 1 and which is in solid particulate form.

5. A process for preparing an emulsifying agent according to claim 1, which comprises mixing the partially hydrolysed vegetable phosphatide and the fatty acid mono/diglyceride at a temperature above the melting point of the combined product and converting the mixture of solid particulate form.

References Cited

UNITED STATES PATENTS

| 2,090,537 | 8/1937 | Lund | 252—356 X |
| 2,142,510 | 1/1939 | Harris et al. | 252—356 X |
| 2,632,705 | 3/1953 | Scharf | 252—356 X |
| 2,640,780 | 6/1953 | Mattikow | 99—15 X |
| 3,505,074 | 4/1970 | Pardun | 99—15 |

RICHARD D. LOVERING, Primary Examiner

U.S. Cl. X.R.

99—15, 123; 252—309, 311, 312